United States Patent [19]

Moffett et al.

[11] Patent Number: 5,272,206
[45] Date of Patent: Dec. 21, 1993

[54] VULCANIZED BLENDS OF THERMOPLASTIC ELASTOMERS AND EPDM RUBBER AND METHOD FOR MAKING

[75] Inventors: Andra J. Moffett; Marijn E. J. Dekkers, both of Schenectady, N.Y.

[73] Assignee: General Electric Company, Schenectady, N.Y.

[21] Appl. No.: 686,447

[22] Filed: Apr. 17, 1991

Related U.S. Application Data

[63] Continuation-in-part of Ser. No. 539,939, Jun. 18, 1990, abandoned.

[51] Int. Cl.$^5$ ............................................. C08L 67/00
[52] U.S. Cl. ........................................ 525/66; 525/166; 525/167; 525/179; 525/180
[58] Field of Search ......................... 525/66, 166, 167

[56] References Cited

U.S. PATENT DOCUMENTS

| | | | |
|---|---|---|---|
| 4,639,486 | 1/1987 | Liu | 525/66 |
| 4,659,765 | 4/1987 | Liu et al. | 524/447 |
| 4,814,380 | 3/1989 | Liu | 525/66 |
| 5,010,136 | 4/1991 | Ohmae et al. | 525/66 |
| 5,096,995 | 3/1992 | Fukumoto | 528/125 |
| 5,098,953 | 3/1992 | Ohmae et al. | 525/176 |

*Primary Examiner*—Ana L. Carrillo
*Attorney, Agent, or Firm*—William A. Teoli; William H. Pittman

[57] ABSTRACT

Vulcanized blends of poly(etherimide ester) copolymer or poly(ether-ester-amide) block copolymer with epoxy functionalized EPDM rubber are provided having enhanced elastic recovery %. Vulcanization of compatibilized blends of the poly(etherimide ester) copolymers or poly(ether-ester-amide) block copolymers with epoxy functionalized EPDM rubber can be effected with crosslinking agents, such as, organic diamines.

10 Claims, No Drawings

VULCANIZED BLENDS OF THERMOPLASTIC ELASTOMERS AND EPDM RUBBER AND METHOD FOR MAKING

REFERENCE TO RELATED APPLICATION

This application is a continuation-in-part of copending application serial no. 07/539,939, filed Jun. 18, 1990 now abandoned. Reference also is made to copending application Ser. No. 07/686,446, now U.S. Pat. No. 5,208,287, filed concurrently herewith which is a continuation in part of copending application Ser. No. 07/540,031 filed Jun. 18, 1990 now abandoned and assigned to the same assignee as the present invention.

BACKGROUND OF THE INVENTION

The present invention relates to the vulcanization of blends of thermoplastic elastomers, such as poly(etherimide ester) copolymers, or poly(ether-ester-amide) block copolymers with epoxy functionalize EPDM rubber. More particularly, the present invention relates to the melt extrusion of thermoplastic blends having an effective amount of a cross-linking agent, such as an organodiamine, and a compatibilized blend of an epoxy functionalized ethylene-propylene-polyene terpolymer (EPDM rubber) and a polyetherimide ester copolymer, or a poly(ether-ester-amide) block copolymer.

Prior to the present invention, thermoplastic elastomers, such as shown by McCready and McCready et al, U.S. Pat. Nos. 4,556,705 and 4,714,754 incorporated herein by reference, which are random poly(etherimide ester)s, were developed to provide materials which could be processed as thermoplastics and yet have the ability to retract forcibly from a large deformation. In addition, ATOCHEM of Courbevoie, France developed PEBAX resins, as shown by U.S. Pat. No. 4,230,838 which are thermoplastic elastomers in the form of poly(ether-ester-amide) block copolymers.

Although random poly(etherimide ester) copolymers, or poly(ether-ester-amide)s of the prior art are marketed as thermoplastic elastomers, new methods for improving the elastic recovery % of these materials are constantly being investigated. In addition, efforts are also directed to improving the ability of these polyether copolymers to resist deterioration of physical properties due to environmental effects such as, elevated temperatures and weathering.

The automotive industry is constantly seeking materials having enhanced % elastic recovery for applications such as CV boots in front wheel drive vehicles. In addition, these materials must be able to resist deterioration due to exposure to constant heat and weathering as determined by ASTM test D573.

A convenient procedure to determine elastic recovery % is to initially calculate the Tensile set % which can be measured on ASTM D638 type I, large Tensile bars pulled on a screw driven Instron testing machine at room temperature.

The Tensile set % can be measured at room temperature according to ASTM D638 section 11.2, and pulled at a rate of 20"/min. The Tensile set % can be calculated as follows:

$$\% \text{ Tensile set} = \frac{L_{after} - L_{original}}{L_{before} - L_{original}} \times 100$$

$L_{after}$ = length between the gauge marks after the specimen has been removed from the grips and allowed to relax for 10 minutes.

$L_{original}$ = is the original length between gauge marks on the specimen (in this case 2.5 inches).

$L_{before}$ = is the length between the gauge marks when the specimen is in the grips and pulled to the full (100 to 200%) extension.

After the Tensile set % is calculated, the elastic recovery % can be determined by substracting the Tensile set % from 100%.

SUMMARY OF THE INVENTION

The present invention is based on the discovery that vulcanized blends of epoxy functionalized EPDM rubber and random poly(etherimide ester) copolymers, or polyether-ester-amide block copolymers have been found to provide thermoplastic elastomers having an enhanced elastic recovery % and the ability to resist a deterioration due to exposure to constant heat and weathering. Vulcanization of the blend of the epoxy functionalized EPDM rubber and the commercially available polyether copolymers can be achieved with an effective amount of a cross-linking agent.

STATEMENT OF THE INVENTION

There is provided by the present invention, a thermoplastic elastomer having an elastic recovery % of at least 50% which is the product obtained by melt extruding a blend comprising by weight, (A) an effective amount of a cross-linking agent and
(B) a melt extruded mixture comprising,
   (i) from about 1% to 99% and preferably 30% to 70% by weight of an EPDM rubber functionalized with from about 0.1 to about 16 epoxy groups, per 1000 carbon atoms, and having from 0.1 to 20 percent by weight of epoxy containing grafting material grafted on the EPDM rubber and,
   (ii) from about 99% to about 1% and preferably 70% to 30% by weight a member selected from the class consisting of a polyetherimide ester copolymer and a polyamide polyether block copolymer, where the cross-linking agent of (A) is a member selected from the class consisting of organic polyamines, organic polyacids, organic polyesters, organic polyanhydrides, organic polysulfides, and precursors thereof.

EPDM rubbers which can be used in the practice of the present invention can be made by a well known procedure, as fully described in patents such as, U.S. Pat. Nos. 2,933,480, 3,093,621, 3,211,709, 3,646,168, 3,790,519, 3,884,993, 3,894,999 and 4,059,654 which are incorporated herein by reference. A typical procedure for making the EPDM rubber is by reacting varying amounts of ethylene, propylene and a polyene monomer containing a plurality of carbon to carbon double bonds which is carried out in the presence of a catalyst and a solvent medium. The polyene monomer which is used as a third component in making the EPDM terpolymer, in addition to the ethylene and propylene to form a terpolymer of ethylene, mono-olefin, preferably propylene, and a polyene, include such polyene monomers as, open chained poly unsaturated hydrocarbons containing 4–20 carbon atoms, such as, 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1) heptane, wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1-20 carbon atoms and preferably 1-8-carbon atoms, 210 the alkenyl norbornenes, and especially the 15-alkenyl-2-norbornenes, wherein the alkenyl group contains about 3-20 carbon atoms and preferably 3-10 carbon atoms. Other bridged ring hydrocarbons include polyunsaturated derivatives of bicyclo(2,2,2)octane as represented by bicyclo(3,2,1)octane polyunsaturated derivatives of bicyclo(3,3,1)nonane and polyunsaturated derivatives of bicyclo(3,2,2)nonane.

Specific examples of preferred bridged ring compounds include 5-methyldene-2-norbornene, 5-ethylidene-2-norbornene, 5-n-propylidene-2-norbornene, 5-isobutylidene-2-norbornene, 5-n-butylidene-2-norbornene, 5-isobutylidene-2-norbornene, dicyclopentadienes, the methyl butenyl norbonenes such as 5-(2-methyl-2-butenyl)-2-norbornene or 5-(3-methyl-2-butenyl)-norbornene, and 5-(3-dimethyl-4-hexenyl)-2-norbornene. The elastomer prepared from 5-ethylidene-2norbornene is preferred.

The EPDM backbone rubber may contain chemically bound molar ratios of ethylene to propylene or other

mono-olefins, varying between 95 to 10, and 5 to 90 ethylene to propylene, and preferably between 70 to 30 and 55 to 45 ethylene to propylene. The polyene or substituted polyene may be chemically bound therein in an amount of 0.1 to 10 mol percent, and preferably 0.3 to 1 mol percent. The level of unsaturation in the backbone rubber may range from 0-20 double bonds, per 1,000 carbon atoms in the polymer chain.

The polymerization reaction for preparation of the EPDM is carried out in the presence of a catalyst in a solvent medium. The polymerization solvent may be any suitable inert organic solvent that is liquid under reaction conditions. Examples of satisfactory hydrocarbon solvents are straight-chain paraffins having from 5-8 carbon atoms with best results often being secured by the use of hexane, aromatic hydrocarbons and preferably an aromatic hydrocarbon having a single benzene nucleus, such as benzene, toluene and the like and saturated cyclic hydrocarbons having boiling point ranges approximately those of the straight chain paraffin hydrocarbons and aromatic hydrocarbons described above and preferably saturated cyclic hydrocarbons having 5-6 carbon atoms in the ring nucleus. The solvent selected can be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler-type catalyst used in the polymerization reaction.

The interpolymerization is carried out in the presence of a Ziegler catalyst of the type well known to the prior art. Such Ziegler-type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleev periodic system of elements, such as titanium, vanadium and chromium halides with an organometallic compound of a metal of groups I, II or II of the Mendeleev periodic system which contains at least one carbon-metal bond, such as trialkyl aluminum and alkyl aluminum halides in which the alkyl groups contain from 1-20 and preferably 1-4 carbon atoms.

The preferred Ziegler catalyst is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, having the general formula R-AlCl and $R_2AlCl$ and the corresponding sesquichlorides of the general formula $R_3Al_2Cl_3$ in which R is methyl, ethyl, propyl, butyl or isobutyl in the catalyst system, the aluminum to vanadium mol ratio of the aluminum and vanadium compounds may be within the range of 5 1 to 200 1 and preferably within the range of 5 1 to 60 1 with best results being secured in the ratio of 40 aluminum to 1 vanadium. These same ratios apply with respect to corresponding compounds of others of the heavy metals substituted for the vanadium compound and the organometallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride, per 5-300 moles of aluminum and more preferably 15-60 moles of aluminum with 40 moles of aluminum per mole of vanadium yielding the best results.

The polymerization is preferably carried out on a continuous basis in a reaction vessel closed to the outside atmosphere which is provided with an agitator cooling means and conduit means for continuously supplying the ingredients of the reaction including monomer catalyst and accelerators and conduit means of continuously withdrawing solution containing elastomer, and the catalyst is killed by the addition of a catalyst deactivator.

In order to achieve thermoplastic elastomers having optimum % elastic recovery, it has been found essential to modify the EPDM rubber with an epoxy compound, such as glycidyl methacrylate. However, any epoxy compound included within the formula,

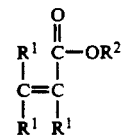

can be used where $R^2$ is an organic group having an epoxide functionality, and $R^1$ is a monovalent radical selected from the class consisting of hydrogen, methyl, ethyl, propyl or $C_{(4-8)}$ alkyl, aralkyl, cyclic or a $C_{(6-13)}$ aromatic organic group. Suitable epoxy functional graft monomers are glycidyl ethers of unsaturated alcohols, i.e., allyl-glycidyl ether, methallyl-glycidyl ether; glycidyl esters of unsaturated carboxylic acids; i.e., glycidyl-2-ethyl acrylate, glycidyl-2-propyl, acrylate glycidyl;

acrylate, glycidyl ethers of alkenylphenols, i.e., isopropenylphenyl-glycidyl ethers; vinyl and allyl esters of epoxy carboxylic acids, vinyl esters of epoxidized oleic acid; and the like. Preferred as the graft monomer herein is glycidyl methacrylate (GMA). Modification of the EPDM rubber with the epoxy functional monomer is preferably achieved by premixing the epoxy monomer with a free radical initiator and thereafter blending the resulting mixture with the EPDM rubber. The resulting blend can be extruded at a temperature of about 100° C. to about 350° C. In the grafting reaction, there can be used 0.1 to 20 parts of the epoxy compound, preferably 2 to 10 per 100 parts by weight of the EPDM rubber.

If desired, the grafting reaction also can be carried out in a solvent solution with the unsaturated EPDM rubber present at a concentration which can range from about 10 to 30% by weight. Suitable organic solvents are for example, $C_{(5-10)}$ aliphatic hydrocarbons, such as hexane, heptane, octane, nonane and decane.

The reaction can be conducted with constant stirring at an elevated temperature within the range of 125°–200° C., and the time ranging from ½ to 2 hours. Preferably the functionalization of the EPDM with the epoxy compound is achieved under melt conditions in the presence of a radical initiator such as, 2,5-dimethyl-2,5-bis(t-butylperoxy)hexane.

The poly(etherimide ester) copolymers used in making the vulcanized blends of the present invention can be prepared by conventional processes from (a) one or more diols, (b) one or more dicarboxylic acids and (c) one or more polyoxyalkylene diimide diacids. Preferred compositions encompassed by the present invention may be prepared from (a) one or more $C_2$–$C_{15}$ aliphatic and/or cycloaliphatic diols, (b) one or more $C_4$–$C_{16}$ aliphatic, cycloaliphatic and/or aromatic dicarboxylic acids or ester derivatives thereof and (c) one or more polyoxyalkylene diimide diacids. The amount of polyoxyalkylene diimide diacid employed is generally dependent upon the desired properties of the resultant polyetherimide ester. In general, the weight ratio of polyoxyalkylene diimide diacid (c) to dicarboxylic acid (b) is from about 0.25 to 2.0 preferably from about 0.4 to about 1.4. The compositions preferably contain additional stabilizers for greater stabilization and low temperature impact strength.

Suitable diols (a) for use in preparing the compositions of the present invention include saturated and unsaturated aliphatic and cycloaliphatic dihydroxy compounds as well as aromatic dihydroxy compounds. These diols are preferable of a low molecular weight, i.e. having a molecular weight of about 250 or less. When used herein, the term "diols" and "low molecular weight diols" should be construed to include equivalent ester forming derivatives thereof. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from about 2 to 15 carbon atoms. Exemplary of these diols there may be given ethyleneglycol, propanediol, butanediol, pentanediol, 2-methyl propanediol, 2,2-dimethyl propanediol, hexanediol, decanediol, 1,2-, 1,3- and 1,4-dihydroxy cyclohexane; 1,2, 1,3- and 1,4-cyclohexane dimethanol; butene diol; hexene diol, etc. Especially preferred are 1,4-butanediol and mixtures thereof with hexanediol or butenediol, most preferably 1,4-dutanediol.

Aromatic diols suitable for use in the practice of the present invention are generally those having from 6 to about 15 carbon atoms. Included amont the aromatic dihydroxy compounds are resorcinol; hydroquinone; 1,5-dihydroxy napthalene; 4,4'-dihydroxy diphenyl; bis(p-hydroxy phenyl)methane and bis(p-hydroxy phenyl)2,2-propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mol %, based on the total diol content, be the same diol, most preferably at least 80 mol %. As mentioned about, the preferred compositions are those in which 1,4-butanediol is present in at least a predominant amount.

Dicarboxylic acids (b) which are suitable for use in the practice of the present invention are aliphatic, cycloaliphatic, and/or aromatic dicarboxylic acids. These acids are preferably of a low molecular weight, i.e., having a molecular weight of less than about 300; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer of this invention.

Aliphatic dicarboxylic acids, as the term is used herein, refers to carboxylic acids having two carboxyl groups each of which is attached to a saturated carbon atom.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethylsuberic acid, tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, substituted dicarboxy compounds with two benzene nuclei such as bis(p-carboxyphenyl) methane, oxybis(benzoic acid), ethylene-1,2-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(β-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mol %, based on 100 mole % of dicarboxylic acid (b) be of the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

Polyoxyalkylene diimide diacids (c) suitable for use herein are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxylalkylene diamine. These polyoxyaklylene diimide diacids and processes for their preparation are more fully disclosed in copending, U.S. patent application Ser. No. 665,192, filed Oct. 26, 1984 entitled "High Molecular Weight Diimide Diacids and Diimide Diesters of Tricarboxylic Anhydrides", now abandoned and incorporated herein by reference.

In general the polyoxyalkylene diimide diacids useful herein may be characterized by the following formula:

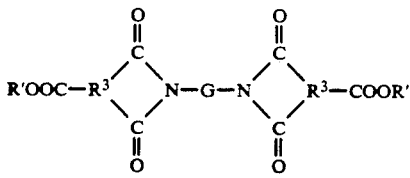

wherein each $R^3$ is independently a trivalent organic radical, preferably a $C_2$ to $C_{20}$ aliphatic, aromatic or cycloaliphatic trivalent organic radical; each $R'$ is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after the removal of the terminal (or as nearly terminal as possible) hydrogen atoms of a long chain polyoxyalkylene diamine prepared from an ether glycol having an average molecular weight of from about 600 to about 12000, preferably from about 900 to about 4000, and a carbon-to-oxygen ratio of from about 1.8 to about 4.3.

Representative long chain ether glycols from which the polyoxyalkylene diamine is prepared include poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as methyl tetrahydrofuran (used in proportion wuch that the carbon-to-oxygen mole ratio in the glycol does not exceed about 4.3). Especially preferred poly(alkylene ether)glycols are poly(propylene ether)glycol and poly(ethylene ether)glycols end capped with poly(propylene ether)glycol and/or propylene oxide.

In general, the polyoxyalkylene diamines useful within the scope of the present invention will have an average molecular weight of from about 600 to 12000, preferably from about 900 to about 4000.

The tricarboxylic component may be almost any carboxylic acid anhydride containing an additional carboxylic group or the corresponding acid thereof containing two imideforming vicinal carboxyl groups in lieu of the anhydride group. Mixtures thereof are also suitable. The additional carboxylic group must be esterifiable and preferably is substantially nonimidizable.

Further, while trimellitic anhydride is preferred as the tricarboxylic component, any of a number of suitable tricarboxylic acid constituents will occur to those skilled in the art including 2,6,7 naphthalene tricarboxylic anhydride; 3,3', 4 diphenyl tricarboxylic anhydride; 3,3', 4 benzophenone tricarboxylic anhydride; 1,3,4 cyclopentane tricarboxylic anhydride; 2,2', 3 diphenyl tricarboxylic anhydride; diphenyl sulfone—3,3', 4 tricarboxylic anhydride, ethylene tricarboxylic anhydride; 1,2,5 napthalene tricarboxylic anhydride; 1,2,4 butane tricarboxylic anhydride; diphenyl isopropylidene 3,3', 4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

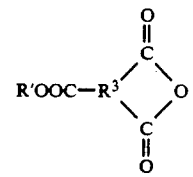

where $R^3$ and $R^1$ are as previously defined. These polyoxyalkylene diimide diacids may be prepared by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

Although the weight ratio of the above ingredients is not critical, it is preferred that the diol be present in at least a molar equivalent amount, preferably a molar excess, most preferably at least 150 mole % based on the moles of dicarboxylic acid (b) and polyoxyalkylene diimide diacid (c) combined. Such molar excess of diol will allow for optimal yields, based on the amount of acids, while accounting for the loss of diol during esterification/condensation.

Further, while the weight ratio of dicarboxylic acid (b) to polyoxyalkylene diimide diacid (c) is not critical to form the novel polyetherimide esters of the present invention, preferred compositions are those in which the weight ratio of the polyoxyalkylene diimide diacid (c) to dicarboxylic acid (b) is from about 0.25 to about 2, preferably from about 0.4 to about 1.4. The actual weight ratio employed will be dependent upon the specific polyoxyalkylene diimide diacid used and more importantly, the desired physical and chemical properties of the resultant polyetherimide ester. In general, the lower the ratio of polyoxyalkylene diimide diester to dicarboxylic acid the better the strength, crystallization and heat distortion properties of the polymer. Alternatively, the higher the ratio, the better the flexibility, tensile set and low temperature impact characteristics.

It is preferred embodiments, the compositions of the present invention will comprise the reaction product of dimethylterephthalate, optimally with up to 40 mole % of another dicarboxylic acid; 1,4-butanediol, optionally with up to 40 mole % of another saturated or unsaturated aliphatic and/or cycloaliphatic diol; and a polyoxyalkylene diimidediacid prepared from a polyoxyalkylene dimine of molecular weight of from about 600 to about 12000, preferably from about 900 to about 4000, and trimellitic anhydride. In its most preferred embodiments, the diol will be 100 mole % 1,4-butanediol and the dicarboxylic acid 100 mole % dimethylterephthalate.

The poly(etherimide ester)s described herein may be prepared by conventional esterification/condensation reactions for the production of polyesters. Exemplary of the processes thay may be practiced are as set forth in, for example, U.S. Pat. Nos. 3,023,192; 3,753,109; 3,651,014; 3,663,653 and 3,801,547, herein incorporated by reference. Additionally, these compositions may be prepared by such processes and other known processes to effect random copolymers, block copolymers or hybrids thereof wherein both random and block units are present.

It is customary and preferred to utilize a catalyst in the process for the production of the poly(etherimide ester)s used in the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters of salts thereof, in order to increase the thermal stability of the resultant polymer.

Exemplary of the suitable known catalysts there may be given the acetates, carboxylates, hydroxides, oxides, alcoholates or organic complex compounds of zinc, manganese, atnimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830 among othere incorporated herein by reference.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,075,952 among otheres, incorporated herein by reference. Especially preferred are the organic titanates such as tetra-butyl titanate, tetraiospropyl titanate and tetra-octyl titanate and the complex titanates derived from alkali or alkaline earth metal alkoxides and titanate esters, most preferably the organic titanates. These too may be used alonge or in combination with other catalysts such as for example, zinc acetate, manganese acetate or antimony trioxide, and/or with a catalyst quencher as described above.

Although the poly(etherimide ester)s used the present invention possess many desirable properties, it is preferred to stabilize certain of the compositions to heat, oxidation, radiation by UV light and the like. This can be accomplished by incorporating stabilizer materials into the compositions either during production or while in a hot melt stage following polymerization. The particular stabilizers useful herein are any of those known in the art which are suitable for poly(etherimide ester)s.

Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris(2-hydroxyethyl)-s-triazine-2,4,6-(1H,3H,5H)trione; 4,4'-bis(2,6-ditertiary-butylphenol); 1,3,5-trimethyl-2,4,6-tris(3,5-ditertiary-butyl-4-hydroxybenzyl)benzene and 4,4'-butylidene-bis(6-tertiarybutyl-m-cresol). Various inorganic metal salts or hydroxides can be used as well as organic complexes such as nickel dibutyl dithiocarbonate, manganous salicylate and copper 3-phenyl-salicylate. Typical amine stabilizers include N,N'-bis(betanaphthyl)-p-phenylene diamine and either phenyl-betanaphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benxotriazoles.

Optionally, it may be desirable to add a minor amount, up to about 20 mole %, preferably up to about 10 mole %, based on the moles of the polyoxyalkylene diimide diacid, of the tricarboxylic component to the reaction mixture. While higher amounts of the tricarboxylic component may be used, this has the disadvantage of reducing some of the beneficial properties of the polymers. Suitable tricarboxylic components are the same as identified above for the preparation of the polyoxyalkylene diimide diacid. While it is preferred that the additional tricarboxylic component be the same as used in the preparation of the polyoxyalkylene diimide diacid, it is not necessary. The addition of the tricarboxylic acid component will have the added benefit of picking up and reacting with any residual, unreacted amine groups and, consequently, aiding in the viscosity build of the polymer itself.

Further the properties of the poly(etherimide ester)s can be modified by incorporation of various conventional inorganic fillers such as carbon black, silica gel, alumina, clays and chopped fiberglass. These may be incorporated in amounts up to 50% by weight, preferably up to about 30% by weight. In general, these additives have the effect of increasing the modulus of the material at various elongations.

The poly(ether-ester-amide) block copolymers which can be used in the practice of the present invention are more fully shown by G. Deleens, Polyether Block Amide Thermoplastic Elastomers, pages 215 through 230 of Thermoplastic Elastomers, A Comprehensive Review, edited by N. R. Legge et al, MacMillan Publishing Company, N.Y. (1987). As discussed by D. Deleens, the preferred procedure for making high molecular weight poly(ether-ester-amide) polyether block copolymers is with ester linkages between the polyamide block and the polyether block. A tetraalkylorthotianate catalyst can be used to modify the compatibility between the diacid terminated polyamide and a dihydroxy polyether. The polyether block amide is obtained by the poly condensation reaction of polyetherdiol blocks and a dicarboxylic polyamide block. The dicarboxylic polyamide blocks are produced by the reaction of polyamide precursers with a dicarboxylic acid chain limiter. The reaction can be achieved at high temperatures which is above 250° C. and generally under a pressure of up to 25 bars. The molecular weight of polyamide block which can be in the range of between about 800 to 5000 is controlled by use of a chain stopper. Polyamide precursers can be selected from amino acids, lactams, dicarboxylic acid and diamines. The dihydroxy polyether blocks can be made by 2 different reactions, such as anionic polymerization of ethyleneoxide and propyleneoxide for polyoxyethlene dihydroxy and polyoxypropylene dihydroxy, or cationic polymerization of tetrahydrofuran for polyoxytetramethylene dihydroxy.

As shown by Foy et al, U.S. Pat. No. 4,230,838, polyether blocks can have the molecular weight of from 400 to 3000. The block copolymerization is a polyesterification achieved at temperatures in a range of 230°-280° C. under vacuum (0.1 to 10 torr) in the presence of a tetraalkylorthotitanate catalyst.

The epoxy functionalized EPDM rubber can be melt compounded with the polyether resin, which hereinafter means either the poly(etherimide ester) copolymer or the poly(ether-ester-amide) block copolymer, to prepare a compatibilized polyether resin-epoxy functionalized EPDM rubber blend. Blending of the functionalized EPDM rubber and the polyether resin can be conducted under neat conditions in an extruder at temperatures in the range of from 100° C. to 350° C. and preferably 175° C. to 250° C.

The blend of the functionalized EPDM and polyether resin which has been compatibilized by melt extrusion, can be dynamically vulcanized by utilizing an effective amount of a curing agent with the compatibilized blend. An effective amount of the curing agent is about 0.1% to 5% by weight of curing agent and preferably 0.5% to 1.5% by weight of curing agent based on the weight of EPDM rubber prior to dynamic vulcanization. The crosslinking reaction is caused to take place through reaction of the crosslinking agent with either residual unsaturation, or residual epoxy groups of the rubber phase. Suitable curing or cross-linking agents are for example, cross-linking agents that react with residual unsaturation such as sulphur and polysulphides; cross-linking agents that react with the residual epoxy groups such as organic diamines or polyamines, organic diacids or polyacids, organic diesters or polyesters, organic dianhydrides or polyanhydrides and other polyfunctional epoxide reactive compounds. More specific examples are hexamethylene diamine, hexamethylene diamine carbamate, benzophenone tetracarboxylic dianhydride, adipic acid and maleic acid or anhydride and their precursors.

Vulcanization of the blend of the curing agent and the compatibilized mixture of the polyester resin and the functionalized EPDM rubber can be achieved by mixing the compatibilized blend with an effective amount of the curing agent and extruding the resulting mixture at temperatures at a range of from 100° C. to 350° C.

In order that those skilled in the art will be better able to practice the present invention the following examples are given by way of illustration and not by way of limitation. All parts are by weight.

EXAMPLE 1

A glycidyl methacrylate (GMA) functionalized EPDM rubber was prepared by initially forming a blend of GMA, 2,5-dimethyl-2,5-bis(p-butylperoxy)-hexane (Lupersol 101) as the radical initiator and EPDM in the form of EPSYN ® E901 pellets, a product of Copolymer Rubber and Chemical Corporation, Baton Rouge, La., having about 83 mole % of ethylene units chemically combined with propylene and norbornene units and an average of 5.4 double bonded carbon atoms per 1000 carbon atoms. In forming the blend, there was used 6.6 parts of a mixture of GMA and the radical initiator at a 10/1 ratio with 100 parts by weight of the EPDM rubber. A premixture was prepared by tumbling the ingredients for 10 minutes. The premixture was then allowed to refrigerate for 16 hours before it was extruded at 205° C. on a Welding Engineer 20 mm Twin Screw extruder. The resulting GMA functionalized EPDM had about 0.1 to about 5 epoxy groups, per 1000 carbon atoms, It was pelletized and dried at 70° C. for 4 hours.

A blend of 45 parts of the GMA functionalized EPDM and 55 parts of LOMOD ® B613 resin of the GE Plastics Division, a random poly(etherimide ester) copolymer having condensed 1,4-benzenecarboxylic acid units, 1,4-butanediol units, 1,6-hexanediol units and hydrohydroxy(poly(oxy-1,4-butanediol)) units was extruded at 400° F. in a Welding Engineer 20 mm Twin Screw extruder. The resulting compatibilized blend was pelletized and dried for 3–4 hours at 90° C. There was added to the dried compatibilized EPDM/LOMOD ® resin blend, 0.56% by weight of the EPDM rubber of 1,6-hexane diamine and the mixture was tumbled in a glass container for 2–3 minutes. The blend was then extruded at 400° F. in a Welding Engineer 20 mm Twin Screw extruder and pelletized. The vulcanized blend was dried at 80° C. for 3–4 hours, molded in an Engel 28 ton injection molding machine at approximately 345° F. to form ASTM D638 test samples.

In addition to the GMA functionalized EPDM/LOMOD resin blends (Composition I) the physical properties of additional EPDM/LOMOD resin blends were also evaluated. For example, Composition II was an extruded blend of EPSYN 901 EPDM/LOMOD resin free of the 1,6-hexane diamine cross-linking agent. Composition III was an extruded blend of EPDM/LO- MOD resin which contained 0.56%, by weight of the EPDM rubber, of the 1,6-hexane diamine. Composition IV was a blend of the GMA functionalized EPDM and LOMOD resin free of 1,6-hexane diamine. Composition V was extruded LOMOD resin free of EPDM and 1,6-hexane diamine.

The tensile properties of the molded test specimens were measured by testing small, Type V, ASTM D638 tensile specimens on a screw driven Instron Testing Machine at a cross-head speed of 1"/min. The following results were obtained:

TABLE 1

| Composition | I | II | III | IV | V |
|---|---|---|---|---|---|
| EPDM | — | 45 | 45 | — | — |
| GMA-functionalized EPDM | 45 | — | — | 45 | — |
| LOMOD | 55 | 55 | 55 | 55 | 100 |
| Vulcanizing agent, x% 1,6-hexane diamine | .25 | 0 | .25 | 0 | — |
| Properties | | | | | |
| Youngs modulus, (kpsi) | 1.4 | 1.2 | 1.1 | 1.3 | 2.1 |
| Elongation at break, (%) | 1100 | 860 | 905 | 1000 | 1650 |
| Tensile strength, (psi) | 1500 | 1100 | 1175 | 1200 | 2600 |
| Tensile set at 100% (%) | 20.5 | 26 | 24 | 24 | 30 |
| Tensile set at 200% (%) | 31.5 | — | — | 36 | — |

The above results show that a significant decrease in Tensile set % or an enhancement in Elastic Recovery % was obtained in accordance with the practice of the method of the present invention resulting from the functionalizing of EPDM rubber, the formation of a compatibilized blend of the functionalized EPDM rubber and the poly(etherimide ester) copolymer and the vulcanization of the resulting compatibilized blend as compared to the original poly(etherimide ester) copolymer. Although a decrease in other physical properties can result, the enhancement in elastic recovery % can provide significant advantages in particular applications.

ASTM D573 test samples were also prepared from the above EPDM/LOMOD ® resin blends and LOMOD ® resin. The respective test samples were aged in a circulating air oven in accordance with ASTM D573, at 150° C. for 70 hours. The physical properties of the LOMOD ® resin samples and the EPDM/LOMOD ® samples were then compared to determine the degree of deterioration due to heat age. The following results were obtained where the % change reflects the increase (+) or decrease (−) in properties as compared to ASTM D573 test samples prior to heat age:

| | LOMOD resin (%) | EPDM/LOMOD resin (%) |
|---|---|---|
| Modulus (Kpsi) | +5.4 | +13.3 |
| Maximum Elongation | −95.2 | −27 |
| Tensile (psi) | −45 | −0.5 |

The above results show that the EPDM/LOMOD resin blend resisted the effects of heat age, while the LOMOD resin was severely deteriorated.

EXAMPLE 2

The procedure of example 1 was repeated except that in place of the 55 parts of the LOMOD ® B613 resin, there was substituted 55 parts of PEBAX4033, a poly(ether-ester-amide) block copolymer in the form of the Atochem Co. of Courbevoie, France, having a MP of 168° C., and resulting from the poly condensation of a (polyalkyleneoxide) block and a dicarboxylic acid terminated polyamide block. In addition, 0.56%, by weight of the EPDM rubber, of 1,6-hexane diamine carbamate (Diak No. 1 ®) of the I. E. Dupont de Nemours Company of Wilmington, Del. was employed as the vulcanizing agent.

Test samples were prepared from the resulting blend (Composition VI) following the procedure of example 1. Additional blends (Compositions VI-IX) were also prepared for evaluation. The following results were obtained:

TABLE 2

| | VI | VII | VIII | IX | X |
|---|---|---|---|---|---|
| Composition | | | | | |
| EPDM | — | 45 | 45 | — | — |
| GMA-functionalized EPDM | 45 | — | — | 45 | — |
| Pebax 4033 | 55 | 55 | 55 | 55 | 100 |
| Vulcanizing agent, x% Diak No. 1[a] | .25 | .25 | 0 | 0 | — |
| Properties | | | | | |
| Youngs modulus, (kpsi) | 2.8 | 5.4 | 5.4 | 2.6 | 5.1 |
| Elongation at break, (%) | 1200 | 530 | 620 | 1160 | 1850 |
| Tensile strength, (psi) | 3060 | 2350 | 2590 | 2740 | 5100 |
| Tensile set at 200% (%) | 26 | 30 | 29 | 27 | 31 |

[a]Diak No. 1 ®: 1,6-hexane diamine carbamate of E. I. DuPont de Nemours Co.

The above results show that a significant increase in elastic recovery % was obtained in accordance with the practice of the method of the present invention.

Although the above examples are directed to only a few of the very many variables which can be employed in the practice of the method of the present invention as well as the compositions obtained therefrom, it should be understood that the present invention is directed to a much broader variety of vulcanized blends of EPDM rubber with either poly(esterimide ether) copolymers or poly(ether-ester-amide) polyether block copolymers as shown in the description preceding these examples.

What is claimed is:

1. A thermoplastic elastomer having an elastic recovery % of at least 50 which is the product obtained by melt extruding a blend comprising,
   (A) a cross-linking agent, and
   (B) a melt extruded mixture comprising,
      (i) from about 1% to 99% by weight of an EPDM rubber functionalized with from about 2 to about 16 epoxy groups, per 1000 carbon atoms, and having from 0.1 to 20 percent by weight of epoxy containing grafting material grafted on the EPDM rubber and,
      (ii) from about 99% to about 1% by weight of a member selected from the class consisting of a poly(etherimide ester) copolymer and a poly(ether-ester-amide) block copolymer, where the cross linking agent of (A) is present at from about 0.1 to 5% by weight of (i) and a member selected from the class consisting of organic polyamines, organic polyacids, organic polyesters, organic polyanhydrides, and organic polysulfides.

2. A thermoplastic elastomer in accordance with claim 1, where there is utilized a poly(ether-ester-amide) block copolymer.

3. A thermoplastic elastomer in accordance with claim 1, where the cross-linking agent is an organic diamine.

4. A thermoplastic elastomer in accordance with claim 1, where the poly(etherimide ester) copolymer is a random copolymer resulting from the reaction between a polyoxyalkylene diimide diacid having α-hydro-ω-hydroxypoly(oxy-1,4-butanediyl) imide groups with a 1,4-benzene-carboxylic acid, a 1,4-butanediol and a 1,6-hexanediol.

5. A method for making a thermoplastic elastomer which comprises melt extruding a mixture of a compatibilized blend of an epoxy functionalized EPDM rubber and a polyether copolymer selected from the class consisting of a poly(etherimide ester) copolymer and a poly(ether-ester-amide) block copolymer and 0.1 to 5% by weight of a cross-linking agent based on the weight of epoxy functionalized EPDM rubber where the cross-linking agent is a member selected from the class consisting of organic polyamines, organic polyacids, organic polyesters, organic polyanhydrides, and organic polysulfides.

6. A method in accordance with claim 5, where there is utilized a poly(ether-ester-amide) block copolymer.

7. A method in accordance with claim 5, where the epoxy functionalized EPDM rubber is a glycidyl methacrylate functionalized EPDM rubber.

8. A method in accordance with claim 5, where the cross-linking agent is an organic diamine.

9. A method in accordance with claim 5, where the cross-linking agent is 1,6-hexane diamine.

10. A method in accordance with claim 5, where the poly(etherimide ester) copolymer is a random copolymer resulting from the reaction between a polyoxyalkylene diimide diacid having α-hydro-ω-hydroxypoly(oxy-1,4-butanediyl) imide groups with a 1,4-benzene-carboxylic acid, a 1,4-butanediol and a 1,6-hexanediol.

* * * * *